United States Patent [19]
Yamada et al.

[11] Patent Number: 5,335,090
[45] Date of Patent: Aug. 2, 1994

[54] IMAGE READING APPARATUS HAVING DETACHABLE OPTICAL SYSTEM

[75] Inventors: Hirokazu Yamada, Yao; Akio Nakajima, Toyokawa; Toshio Tsuboi, Okazaki, all of Japan

[73] Assignee: Minolta Camera Kabushiki Kaisha, Osaka, Japan

[21] Appl. No.: 580,260

[22] Filed: Sep. 10, 1990

[30] Foreign Application Priority Data

Sep. 11, 1989 [JP] Japan ................................ 1-236467
Sep. 11, 1989 [JP] Japan ................................ 1-236468
Sep. 11, 1989 [JP] Japan ................................ 1-236469

[51] Int. Cl.$^5$ .............................................. H04N 1/024
[52] U.S. Cl. ........................................ 358/473; 382/59
[58] Field of Search .................... 358/473, 409, 475; 382/59

[56] References Cited

U.S. PATENT DOCUMENTS

| | | | |
|---|---|---|---|
| 4,731,668 | 3/1988 | Satomura et al. | 358/409 |
| 4,887,165 | 12/1989 | Sato et al. | 382/59 |
| 4,947,261 | 8/1990 | Ishikawa et al. | 358/473 |
| 4,969,054 | 11/1990 | Tsuji et al. | 358/473 |
| 5,045,953 | 9/1991 | Kotani et al. | 358/473 |

FOREIGN PATENT DOCUMENTS

| | | | |
|---|---|---|---|
| 0116360 | 9/1981 | Japan | 358/473 |
| 0125158 | 10/1981 | Japan | 358/473 |
| 0009164 | 1/1982 | Japan | 358/473 |
| 0079760 | 5/1982 | Japan | 358/473 |
| 0244150 | 12/1985 | Japan | 358/473 |
| 0257654 | 12/1985 | Japan | 358/473 |
| 62-193453 | 8/1987 | Japan . | |
| 63-184453 | 7/1988 | Japan . | |

*Primary Examiner*—Edward L. Coles, Sr.
*Assistant Examiner*—Thomas L. Stoll
*Attorney, Agent, or Firm*—Price, Gess & Ubell

[57] ABSTRACT

An image reading apparatus according to the present invention comprises a first unit for scanning an original while exposing the original to light, and a second unit detachably provided to the first unit for receiving light from the first unit and converting an original image into electrical signals. The first unit includes a light source for irradiating the original and an optical member for projecting the original image at a predetermined position. The second unit is provided in the vicinity of the predetermined position and includes an image sensor for reading the original image to generate the electrical signals, a signal processing portion for processing the electrical signals generated from the image sensor, and a storage portion for storing the processed electrical signals.

2 Claims, 15 Drawing Sheets

FIG.9

| NUMBER | SIGNAL | INPUT/OUTPUT |
|---|---|---|
| 1 | POWER SOURCE | OUTPUT |
| 2 | GROUND | — |
| 3 | EXPOSURE ON | OUTPUT |
| 4 | READ START | INPUT |
| 5 | SYNCHRONIZING CLOCK | INPUT |
| 6 | MIRROR IMAGE | INPUT |
| 7 | OPTICAL SYSTEM SET | INPUT |
| 8 | SIGNAL · GROUND | — |

IMAGE READING APPARATUS HAVING DETACHABLE OPTICAL SYSTEM

BACKGROUND OF THE INVENTION

1. Field of the Invention

The present invention generally relates to image reading apparatuses, and more particularly, to an image reading apparatus having a processing portion and an optical system detachably provided thereto.

2. Description of the Related Arts

Office automation equipment of recent years have been developing from a stand-alone type to a multifunctional type. Among those multifunctional equipment, image reading apparatuses have become important as input means in preparing an original of an image or documents.

The image reading apparatuses analyze an original image into a minute net pattern, convert image portions and non-image portions into binary of black and white, respectively, and output the converted results to an external equipment as a digital signal. As such image reading means, apparatuses of handy scanner type which are superior in portability add have applicability to a wide range of objects to be read have been developed, as well as those of an installed type.

An image reading apparatus is generally comprised of an optical system which scans an original image to form an image and a processing portion which reads out the thus formed image and processes the read-out image.

The conventional image reading apparatus as described above has its optical system and processing portion integrally incorporated therein. Accordingly, it is impossible, for example, to enlarge the read width or change the reading manner in reading out from one original.

Further, though a handy scanner whose optical system comprises CCD and which can be separated from its processing portion has been developed, the optical system and the CCD are still manufactured as an integral part. Therefore, the read width can not be easily changed.

As described above, in order to change the read width and the like, an additional image reading apparatus becomes necessary, resulting in a disadvantage in terms of cost and also of use.

SUMMARY OF THE INVENTION

An object of the present invention is to enhance usability of an image reading apparatus.

Another object of the present invention is to improve economy of an image reading apparatus.

Still another object of the present invention is to easily change the read width of an image reading apparatus.

Still another object of the present invention is to perform appropriate image processings in an image reading apparatus even with a replaceable optical system.

To achieve the objects described above, an image reading apparatus, according to one aspect of the present invention, comprises a first unit for scanning an original while exposing the same to light and a second unit detachably provided to the first unit to receive light from the first unit and convert an image of the original into electrical signals. The first unit includes a light source for irradiating the original and optical members for projecting an image of the original in a predetermined position. The second unit is provided in the vicinity of the predetermined position and includes an image sensor reading an image of the original to generate the electrical signals, a signal processing portion for processing the electrical signals generated from the image sensor, and a storage portion for storing the processed electrical signals.

The image reading apparatus configured as described above has the first and second units provided detachably from each other, so that its read width can be easily changed, enhancing its usability and economy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing an input/output state of various signals at a scanner portion when observed from a read portion according to an embodiment of the present invention.

DESCRIPTION OF THE PREFERRED EMBODIMENTS

Figure 1:
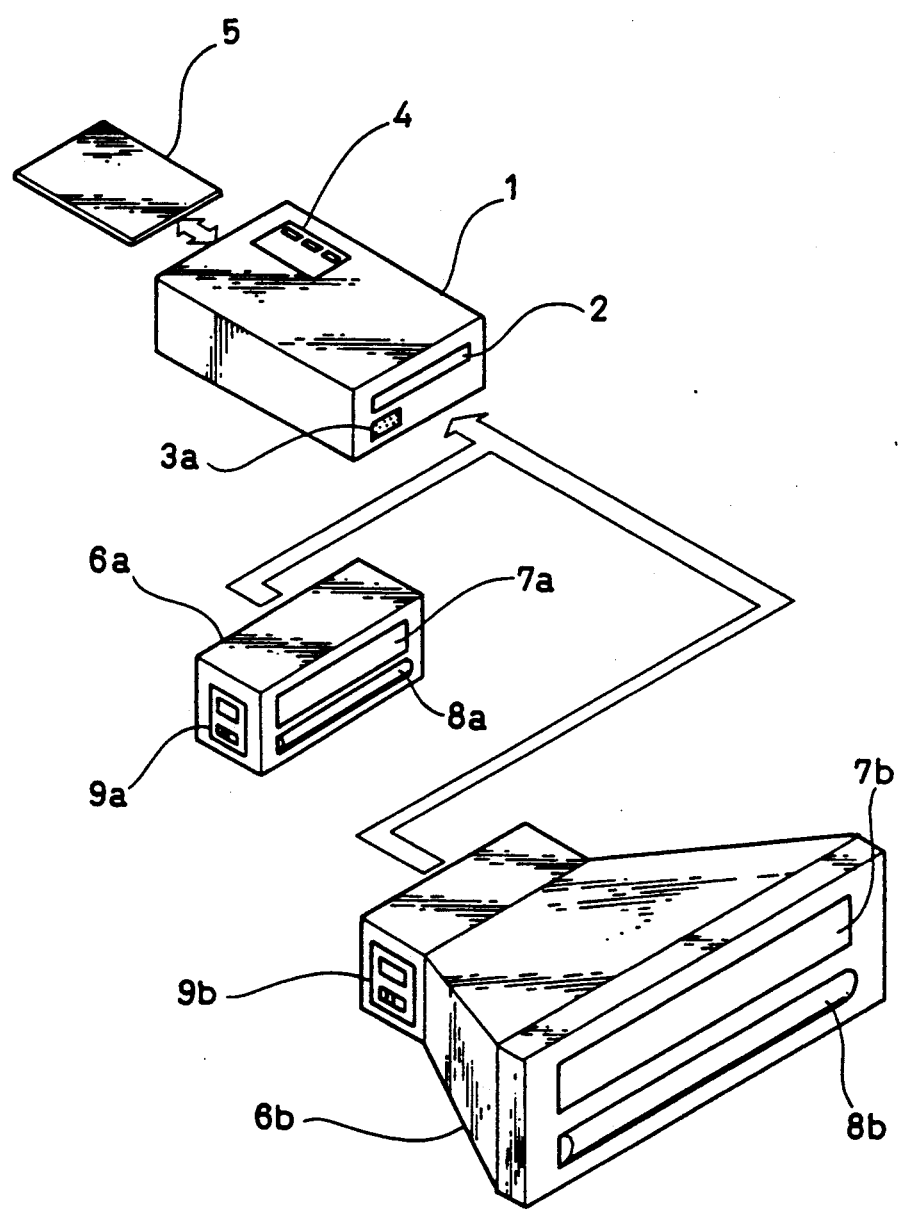
FIG. 1 is a perspective view showing a contour of a read portion, a scanner portion and a memory card according to an embodiment of the present invention.

FIG. 1 is a schematic perspective view showing structure of a handy scanner, according to an embodiment of the present invention.

Referring to FIG. 1, the structure will be described below.

Scanner portions 6a and 6b for scanning an original to form image data and read portion (processing portion) 1 for reading and processing the image data are detachable from each other. Light receiving window 2 for receiving light incoming through scanner portions 6a and 6b and connector 3a for making electrical connection to the scanner portions are formed on an end surface of read portion 1. On the upper surface of read portion 1, there is formed display portion 4 for indicating operation state of the handy scanner. Further, read portion 1 can have memory card 5 inserted therein as an external storage device. As the scanner portions, there are shown standard scanner portion 6a and scale-down scanner portion 6b. The scanner portions 6a and 6b have switch portions 9a and 9b, respectively, formed on their side surfaces. On the sides for scanning an original, there are formed read windows 7a and 7b, respectively, for reading the original. Also on the scanning surfaces of scanner portions 6a and 6b, there are formed rollers 8a and 8b, respectively, which rotate while scanning is performed. These scanner portions 6a and 6b are detachable from read portion 1 and when attached to read portion 1, they are electrically connected to read portion 1 through connector 3a and serve as a handy scanner integrally with the combined read portion 1.

Figure 2:
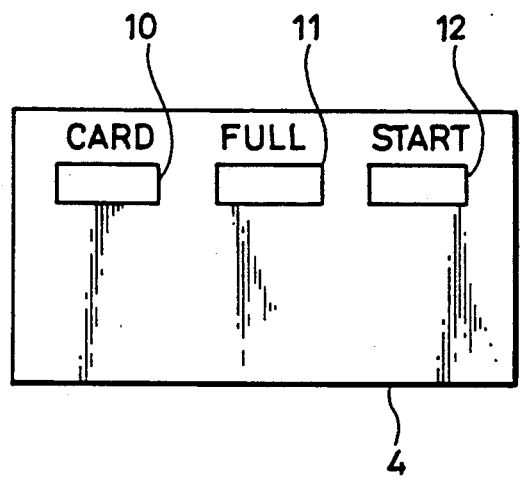
FIG. 2 is a plan view showing details of a display portion provided on the upper surface of the read portion shown in FIG. 1.

FIG. 2 is a plan view showing details of display portion 4 formed on read portion 1 shown in FIG. 1.

In FIG. 2, there are formed card LED 10 showing whether a memory card has been inserted or not, data full LED 11 showing whether there is a margin in storage capacity of the memory card or not, and start LED 12 showing whether a reading operation has been started or not.

Figure 3:
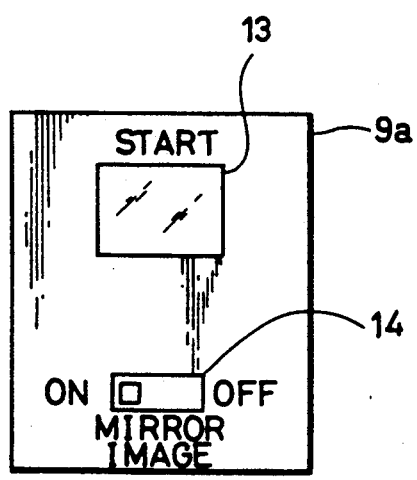
FIG. 3 is a diagram showing details of a switch portion provided in the standard scanner portion shown in FIG. 1.

FIG. 3 is a plan view showing details of switch portion 9a of standard scanner portion 6a shown in FIG. 1.

In FIG. 3, there are provided start key 13 for giving instructions to start reading and mirror image switch 14 for giving instructions as to whether or not data should be processed as those of a mirror image.

Figure 4:
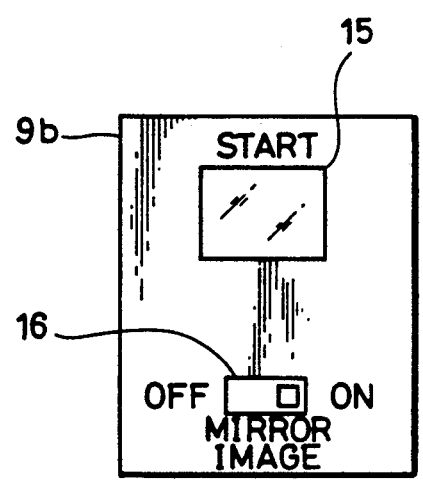
FIG. 4 is a diagram showing details of a switch portion provided on the scale-down scanner portion shown in FIG. 1.

FIG. 4 is a plan view showing details of switch portion 9b formed on a side surface of scale-down scanner portion shown in FIG. 1.

In FIG. 4, there are provided start key 15 for giving instructions to start reading and mirror image switch 16 for giving instructions as to whether or not data should be processed as those of a mirror image. Meanwhile, a description of processings performed on the mirror image data will be given later.

Figure 5:
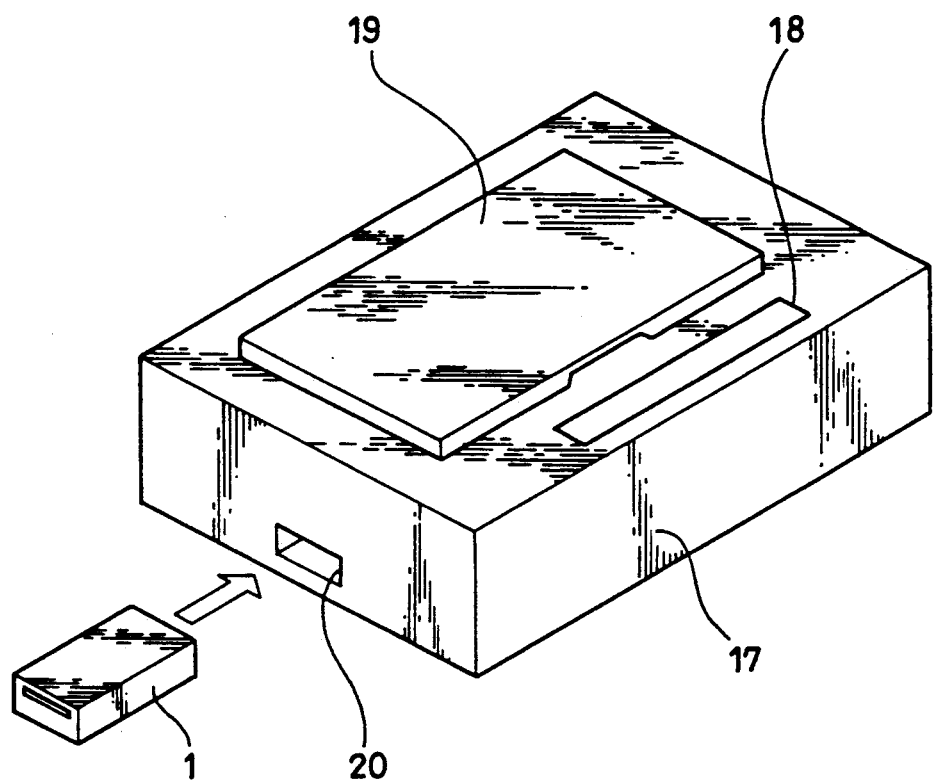
FIG. 5 is a perspective view showing a contour of a platen-fixed scanner portion and a read portion according to another embodiment of the present invention.

FIG. 5 is a perspective view schematically showing structure of platen-fixed scanner portion 17 with read portion 1 shown in FIG. 1 being inserted therein.

In FIG. 5, there are formed on the upper surface of platen-fixed scanner portion 17, operation portion 18 for giving instructions of a scanning operation and platen cover 19 for covering an original placed on the scanner portion. Further, on a side surface of scanner portion 17, there is formed an insert portion 20 to receive read portion 1. Therefore, when read portion 1 is inserted in insert portion 20, this scanner portion can serve as a normal plate-fixed image reading apparatus.

Figure 6:
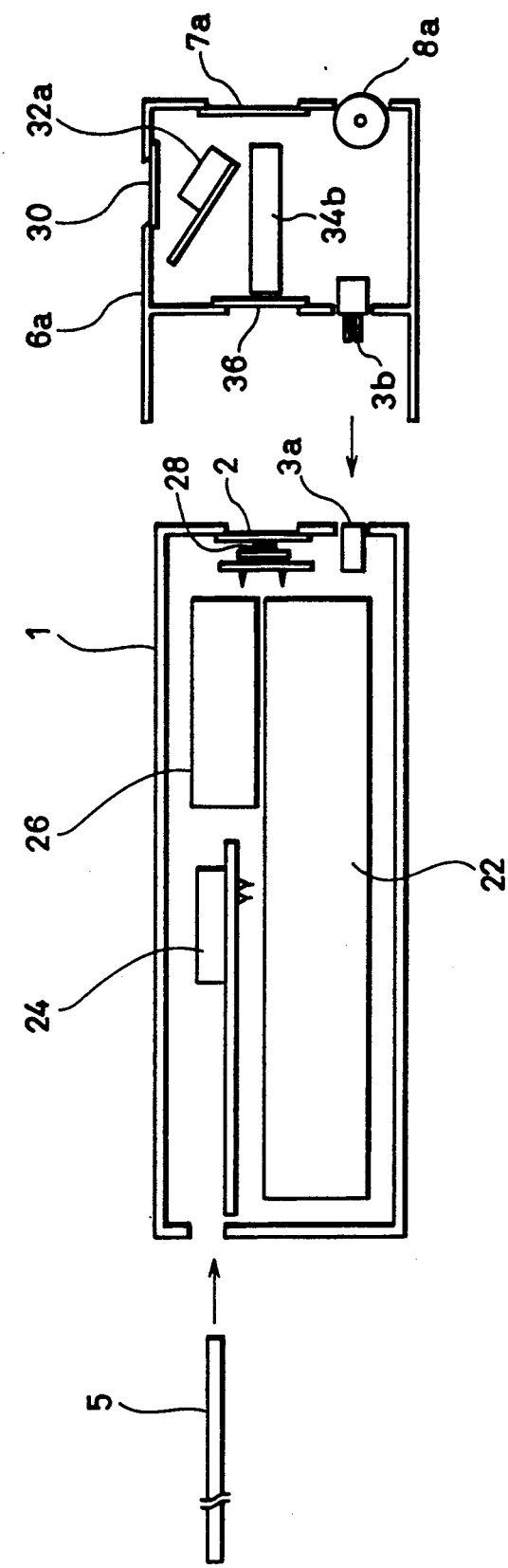
FIG. 6 is a sectional view showing an internal structure of the read portion and the standard scanner portion shown in FIG. 1.

FIG. 6 is a sectional view schematically showing internal structure of the standard scanner portion and the read portion shown in FIG. 1.

Referring to FIG. 6, the structure will be described below.

Scanner portion 6a is arranged such that exposure LED array 32a for exposing an original to light can irradiate the original through read window 7a. Above exposure LED array 32a, there is formed window 30 for making sure positioning of the original. The original exposed to the light of LED array 32a is imaged through rod lens array 34b and window 36 at CCD of read portion 1. Under read window 7a, there is provided roller 8a which rotates when scanner portion 6a performs scanning. Under window 36, there is formed connector 3b for electrically connecting scanner portion 6a to read portion 1. On the side of read portion 1 receiving scanner portion 6a, there are provided light receiving window 2 and connector 3a. The incoming light from scanner portion 6a is transmitted through light receiving window 2 and received at CCD 28 to be converted into electrical signals. Connector 3a is connected to connector 3b of scanner portion 6a to make electrical connection between read portion 1 and scanner portion 6a. Inside read portion 1, there is provided controlling/processing portion 22 for controlling reading operation and processing read-out data, over which card connector 24 for submitting and receiving data to and from inserted memory card 5 and power supply portion 26 for supplying power to operate as a reading apparatus are provided.

FIGS. 7A to 7D are sectional views schematically showing various scanner portions attached to image reading apparatuses according to an embodiment of the present invention.

Figure 7A:
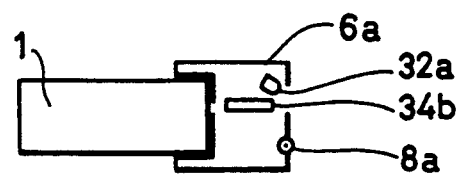
FIGS. 7A to 7D are schematic diagrams showing various scanner portions with read portions combined therewith.
Figure 7B:
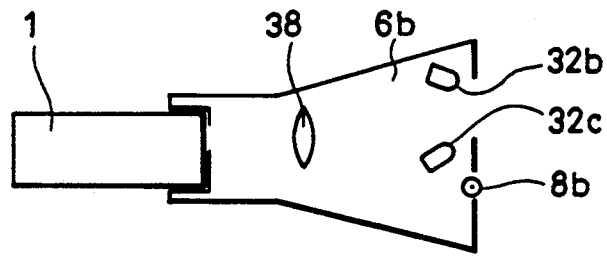
Figure 7C:
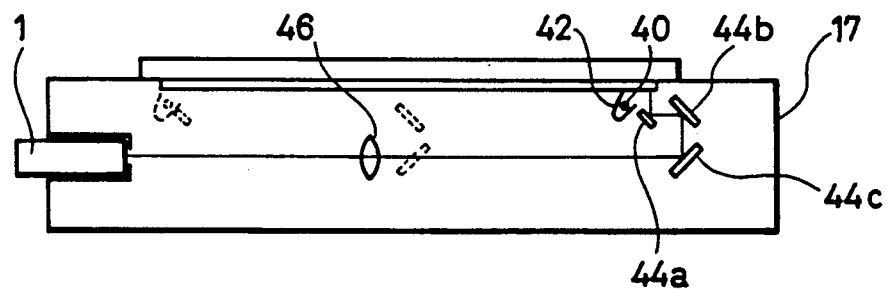
Figure 7D:
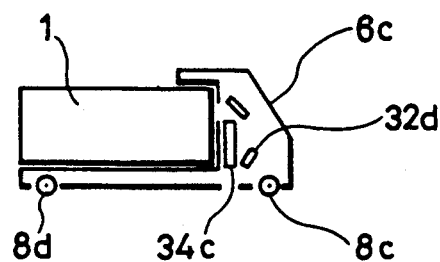

FIG. 7A shows a standard scanner portion, FIG. 7B shows a scale-down scanner portion, FIG. 7C shows a platen-fixed scanner portion, and FIG. 7D shows a crawling-type scanner portion, all of which are shown in the attached state.

The standard scanner portion 6a as shown in FIG. 7A has an exposure LED array 32a, a rod lens array 34b and a roller 8a. The scale-down scanner portion 6a as shown in FIG. 7B has a pair of exposure LED arrays 32b and 32c, a focusing lens 38 and a roller 8b. The platen-fixed scanner portion 17 as shown in FIG. 7C has a first movable optical system including an exposure lamp 40, an illumination mirror 42 and a reflector 44a, a second movable optical system including reflectors 44b and 44c, and a focusing lens 46. The first and second optical systems move along an original placed on a platen for scanning the original. The crawling-type scanner portion 6c as shown in FIG. 7D has an exposure LED array 32d, a rod lens array 34c, a pair of rollers 8c and 8d and a motor (not shown) for driving the rollers 8c and 8d.

Figure 8:
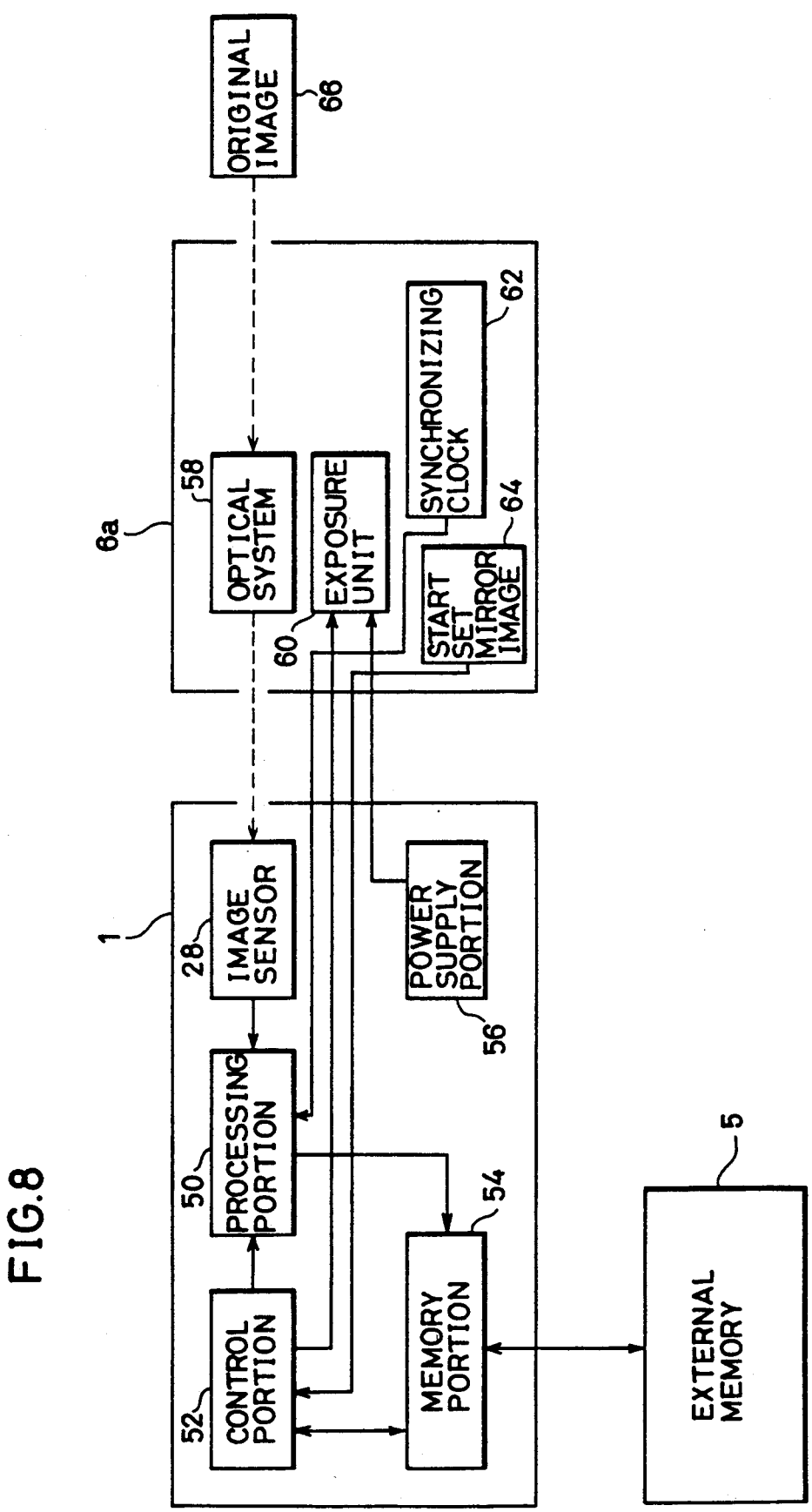
FIG. 8 is a block diagram showing electrical structure of a read portion and a scanner portion according to another embodiment of the present invention.

FIG. 8 is a block diagram showing electrical structure of an image reading apparatus according to an embodiment of the present invention.

Referring to FIG. 8, structure and operation of the image reading apparatus will be described below.

Upon reception of input from start switch 64 in scanner portion 6a, control portion 52 gives instructions of exposure to make exposure unit 60 in scanner portion 6a operate. In response to the instructions from control portion 52, exposure unit 60 irradiates an original and then the light reflected from original image 66 is processed by optical system 58 to form an image on image sensor 28 in read portion 1. The received light is converted into electrical signals by image sensor 28 and output to processing portion 50. In processing portion 50, based on a clock signal output from synchronizing clock 62 in scanner portion 6a, the electric signals from image sensor 28 are selectively output to memory portion 54 and stored therein as memory data. The data stored in memory portion 54 are transmitted to external memory 5 under control of control portion 52.

The synchronizing clock generator 62 generates the clock signal according to scanning speed of the scanning portion 6a. The scanning clock generator 62 may include an encoder connected to the roller 8a in order to obtain the clock signal according to scanning speed. In this case, encoder pulses generated by the encoder in synchronism with rotation of the roller 8a are used as clock signal.

In this embodiment, since the optical system and the processing portion are separable from each other, it becomes necessary to change timings of generating read clock according to the changes in structure of optical systems, scanning speed and the like. For this reason, each scanning portion has a synchronizing clock generator which generates a clock signal according to scanning speed. The standard scanner portion 6a and the scale-down scanner portion 6b may have an encoder connected to the roller 8a and 8b. While, the platen-fixed scanner portion 17 and the crawling-type scanner portion 6c may use a clock included in a microcomputer by which scanning operation is controlled.

FIG. 9 is a diagram showing input/output state of signals to and from scanner portion 6a when observed from read portion 1.

In FIG. 9, the output of a power source signal represents that power supply portion 56 in read portion 1 is supplying power to scanner portion 6a for the exposure and signal generation.

A ground signal represents that the apparatus is grounded for power source. The output of an exposure ON signal represents that exposure in a scanner portion 6a is in on the state. The input of a read start signal represents that reading operation has been started, or a start signal has been output, in scanner portion 6a. The input of a synchronizing clock signal represents that a reading has been started in scanner portion 6a and accordingly, the synchronizing signal has been input. The input of a mirror image signal represents that an image read out in scanner portion 6a has formed a mirror image. The input of an optical system set signal represents that either of the scanner portions has been attached to the read portion. A signal ground signal represents that the apparatus is grounded for the signals.

Although only the scanner portion 6a is shown in FIGS. 8 and 9, the other scanner portion 6b, 6c and 17 may have substantially the same electrical structure and operation as those of the scanner portion 6a.

Figure 10:
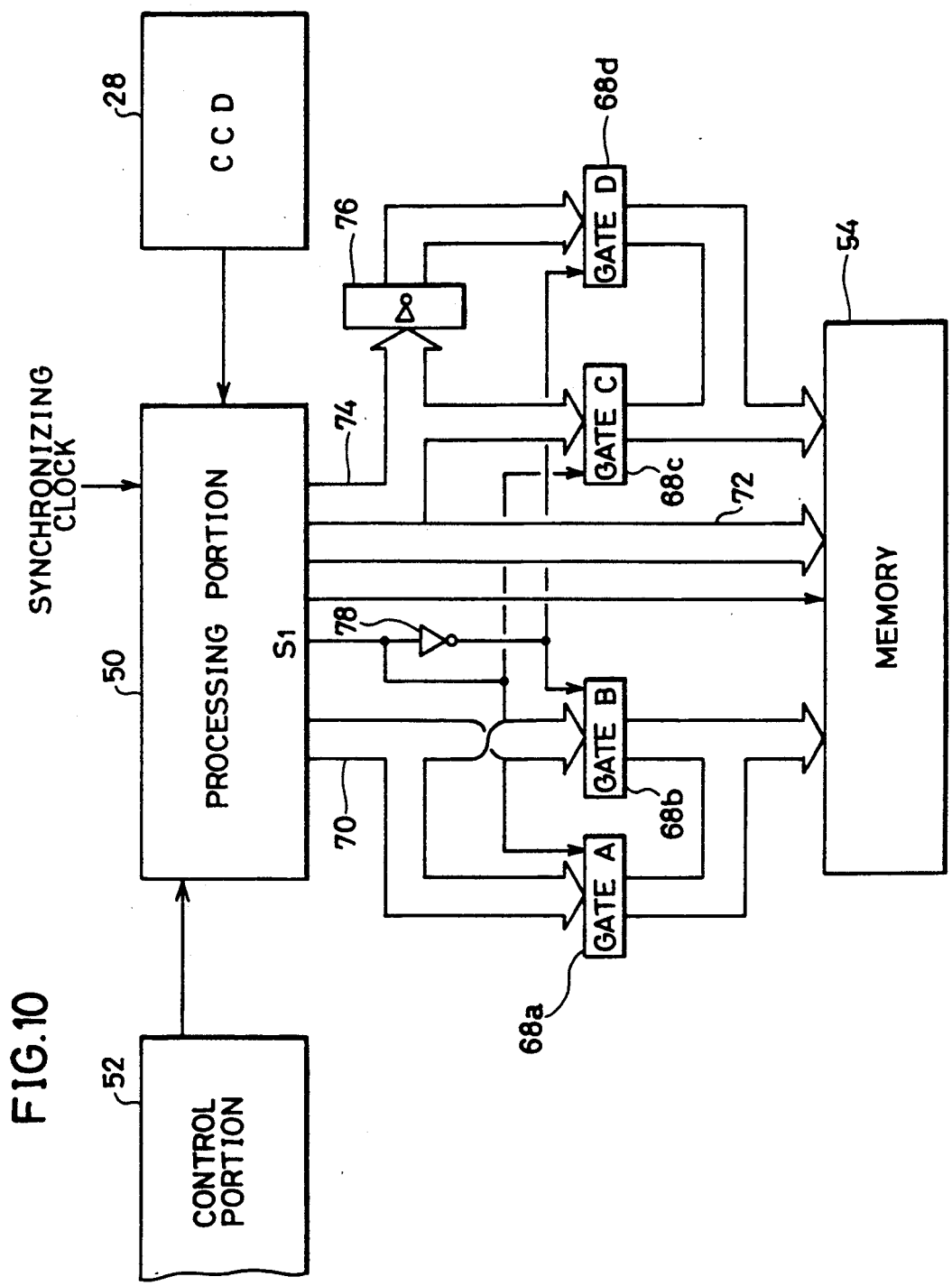
FIG. 10 is a diagram showing a data flow from the processing portion to the memory portion shown in FIG. 8.

FIG. 10 is a diagram showing flow of data processings between control portion 52 and memory portion 54 shown in FIG. 8.

In FIG. 10, the electrical signals output from CCD 28 are processed in processing portion 50 based on the synchronizing clock. The processings fall under nominal mode and mirror image mode. In the normal mode, a read-out original image is processed as such, and in the mirror image mode, a read-out original image is inverted before processed.

In this embodiment, the standard scanner portion 6a having a rod lens array 34b, while the scale-down scanner potion 6b has a standard focusing lens 38. Therefore, if image data received at a processing portion are processed to form an erect image in the same manner that the standard scanner portion 6a is used, a mirror image is formed because of difference of image projection element when the scale-down scanner portion is used. To solve this problem, data processings of this embodiment include the normal mode and the mirror image mode.

In the normal mode, gates A 68a and C 68c are selected. That is, the data output from processing portion 50 are transmitted through data bus 70 to memory 54 and stored therein as they are without undergoing inversion between significant and less significant bits. Further, data representing addresses of one line are transmitted from processing portion 50 to memory 54 through address bus 74 without passing through inverter 76. This means that the addresses are transmitted to memory 54 without undergoing inversion between significant and less significant addresses.

On the other hand, in the mirror image mode, gates B 68b and D 68d are selected. In this case, the data output from processing portion 50 are subjected to inversion between significant and less significant bits before passing through gate B68b. Further, data representing addresses of one line pass through inverter 76 on address bus 74 so that significant and less significant addresses are inverted before entered in memory 54.

Meanwhile, the selection of gates A to D is made through operation of inverter 78 which receives an output signal S1 from processing portion 50 set to the "H" or "L" level.

Figure 11:
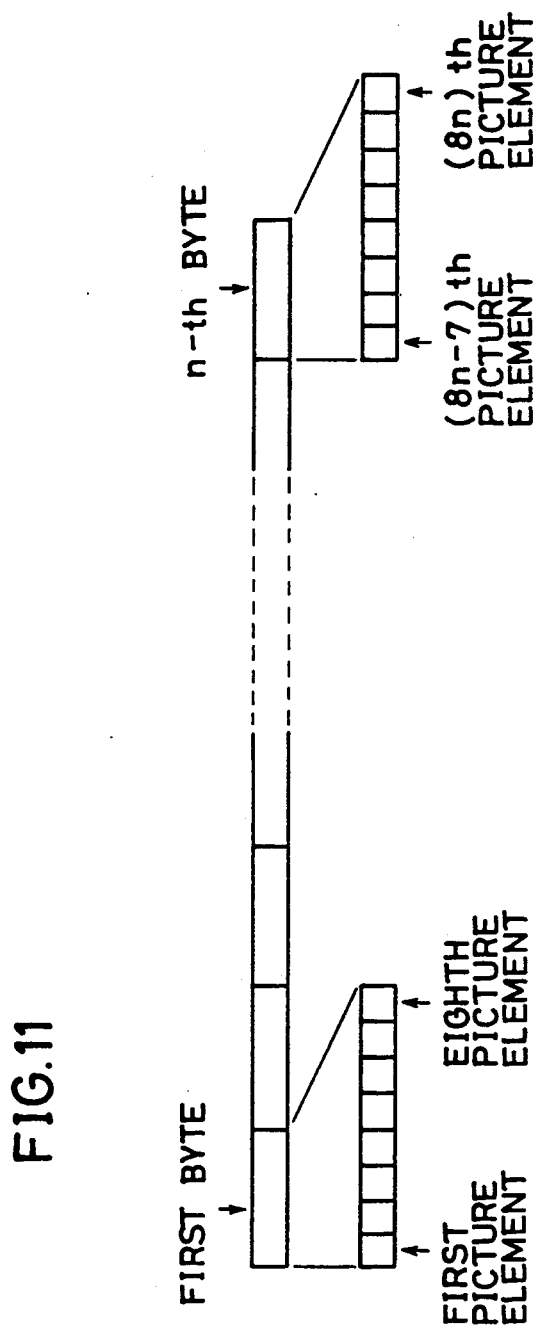
FIG. 11 is a diagram showing data composition of a read-out image.

FIG. 11 is a diagram showing data composition of one-line image in memory 54 according to an embodiment of the present invention.

In FIG. 11, 1 byte is composed of 8 bits of picture element, i.e., data of first to eighth picture elements. An image of one line is composed of data of consecutive n bytes, i.e., first to n-th bytes. In the case of the picture elements of n-th byte, therefore, the first picture element is represented as (8n−7)th picture element and the last one is represented as (8n)th picture element. Thus, data of one-line image is composed of 8n picture elements in total including the first to (8n)th picture elements.

Figure 12A:
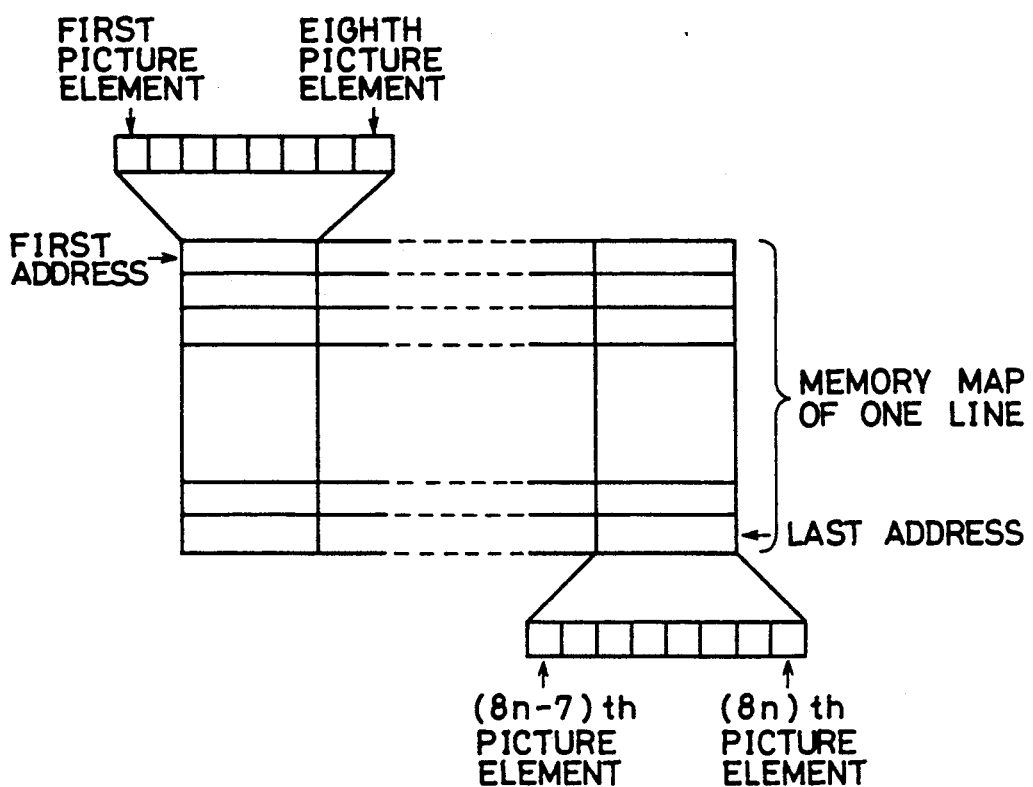
FIG. 12A is a diagram showing composition of data stored in a memory in normal mode.

FIG. 12A is a diagram showing data of picture elements stored, based on the data composition of one-line image shown in FIG. 11, in memory 54 in the nominal mode.

In the normal mode, the first byte, or the first to eighth picture elements are stored at the first address in a memory map of one-line, and the last byte, or the (8n−7)th to (8n)th picture elements of the n-th byte are stored at the last address. That is, the data of picture elements are stored at the first to last addresses in the same sequence as they were read out of an original image.

Figure 12B:
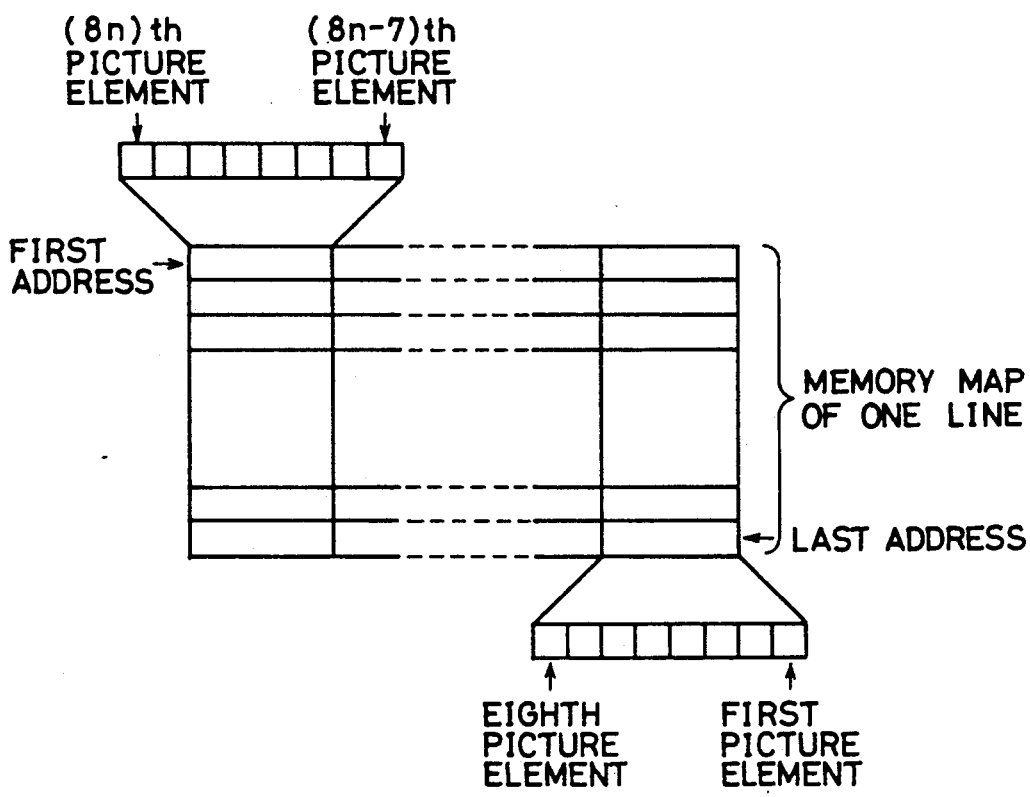
FIG. 12B is a diagram showing composition of data stored in a memory in mirror image mode.

FIG. 12B is a diagram showing data of picture elements stored, based on the data composition of one-line image shown in FIG. 11, in memory 54 in the mirror image mode.

In FIG. 12B, the last byte, or the (8n−7)th to (8n)th picture elements of the n-th byte are stored at the first address in a memory map of one-line, with their significant and less significant bits inverted. The first byte, or the first to eighth picture elements of the first byte are stored at the last address in the memory map of one-line, also with their significant and less significant bits inverted. In the mirror image mode, therefore, the picture elements are stored in reverse sequence as compared with that in reading them out of an original image. Thus, in the mirror image mode, a mirror image which corresponds to the inverted read-out original image is output through a printer and the like, using the thus stored data of picture elements.

Figure 13:
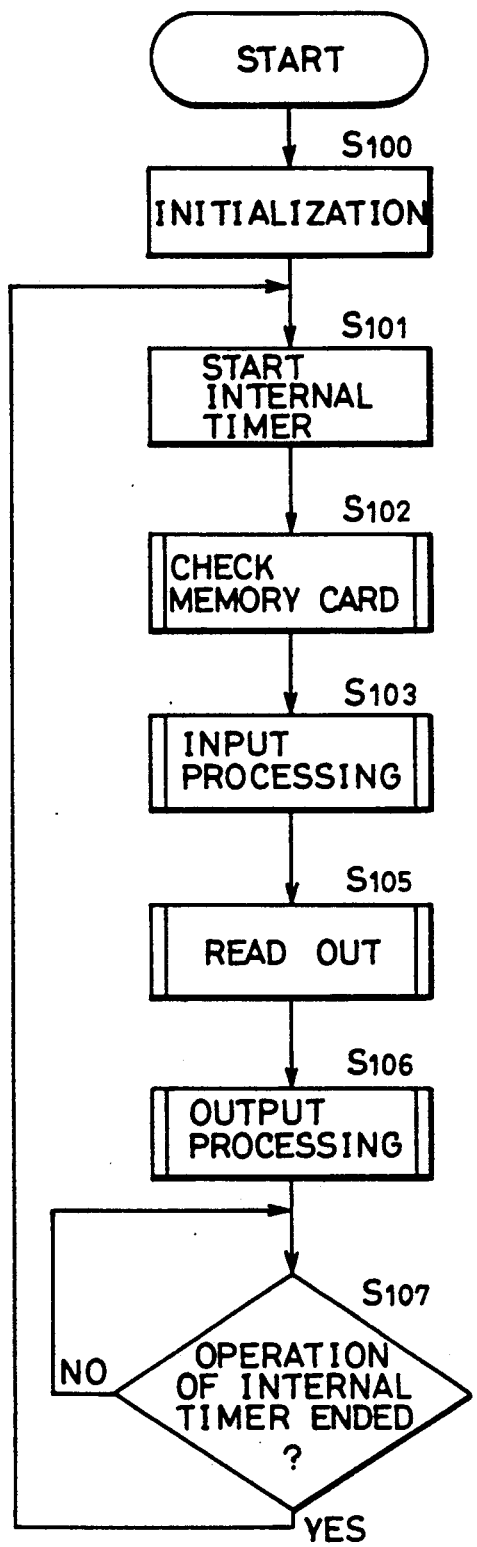
FIG. 13 is a flow chart diagram showing a main routine in the control portion shown in FIG. 8.

FIG. 13 is a flow chart diagram showing a main routine in the control portion shown in FIG. 8.

First, when power is turned on at step S100, settings of conditions for a reading operation and of an internal register memory, an internal timer and the like are made. At step S101, the internal timer is started to determine length of the main routine set at the initialization step. Subsequently, at step S102, presence or absence of an inserted memory card and margin in data storage capacity of the memory card are checked. At step S103, input processing such as input from a switch, sensor or the like and setting of flags is performed. At step S105, an image reading operation is controlled and at step S106, output processing is performed where processing state of the image reading apparatus is displayed.

Next, at step 107, determination is made as to whether the internal timer has ended operation or not. When the internal timer has ended its operation, the routine returns to step 101. In this manner, the main routine has its one cycle time determined by the internal timer and is repeated as long as power is on.

Figure 14:
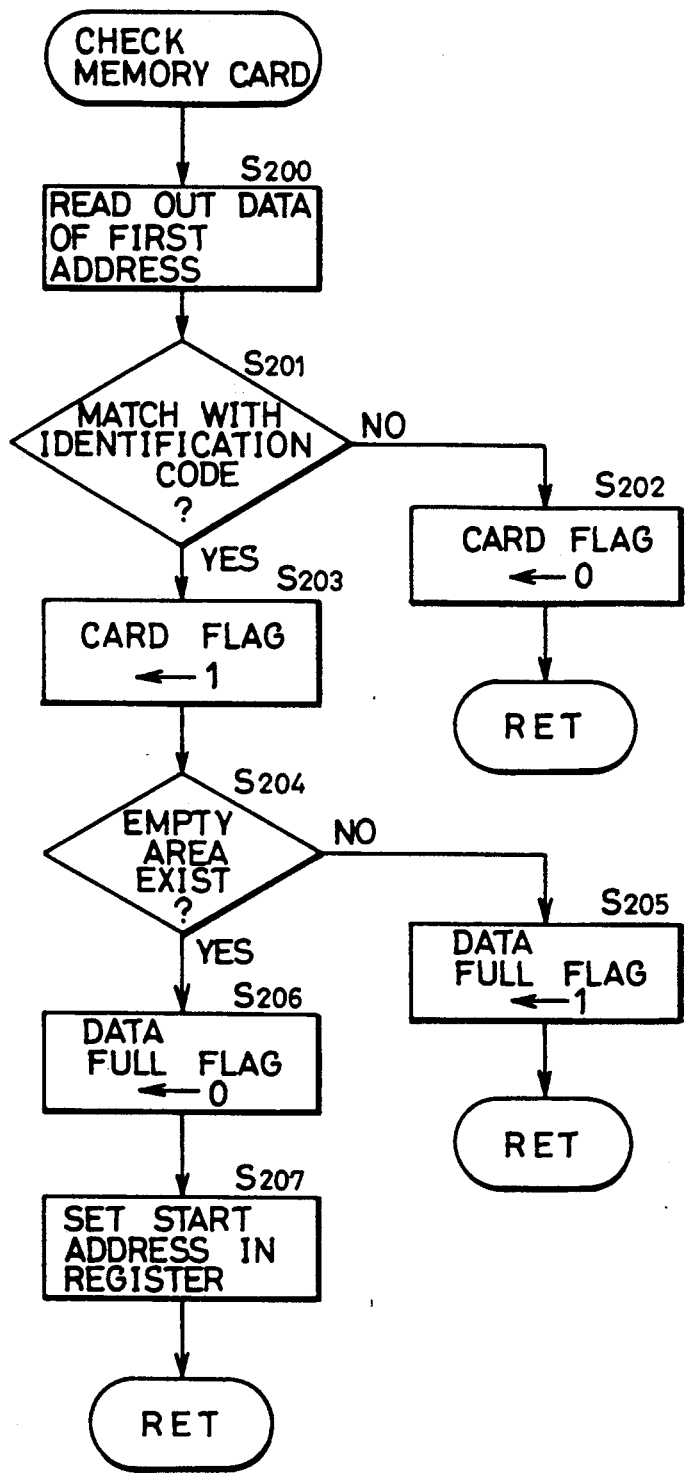
FIG. 14 is a flow chart diagram showing specific contents of the subroutine shown in FIG. 13 where a memory card is checked.

FIG. 14 is a flow chart diagram showing specific contents of a subroutine shown in FIG. 13 where a memory card is checked.

First, at step S200, data stored at the first address of a memory card is read out. At step S201, determination is made as to whether the read-out data matches an identification code. When match occurs, a card flag is made to represent 1 so as to indicate presence of the card (S203). On the other hand, when no match occurs (NO at step S201), the card flag is made to represent 0 thereby indicating absence of memory card. Then, the operation returns to the main routine (S202).

When the presence of a memory card is determined, then determination is made at step S204 as to whether or not there remains a memory area for storing image data. When some memory area remains, a data full flag is made to represent 0 and a start address is set in the register (S207) in order to set a first address for storing data of an image. When there remains no memory area (NO at S204), the data full flag is made to represent 1 thereby indicating that there remains no margin in the storage capacity, and then the operation returns to the main routine (S200).

Figure 15:
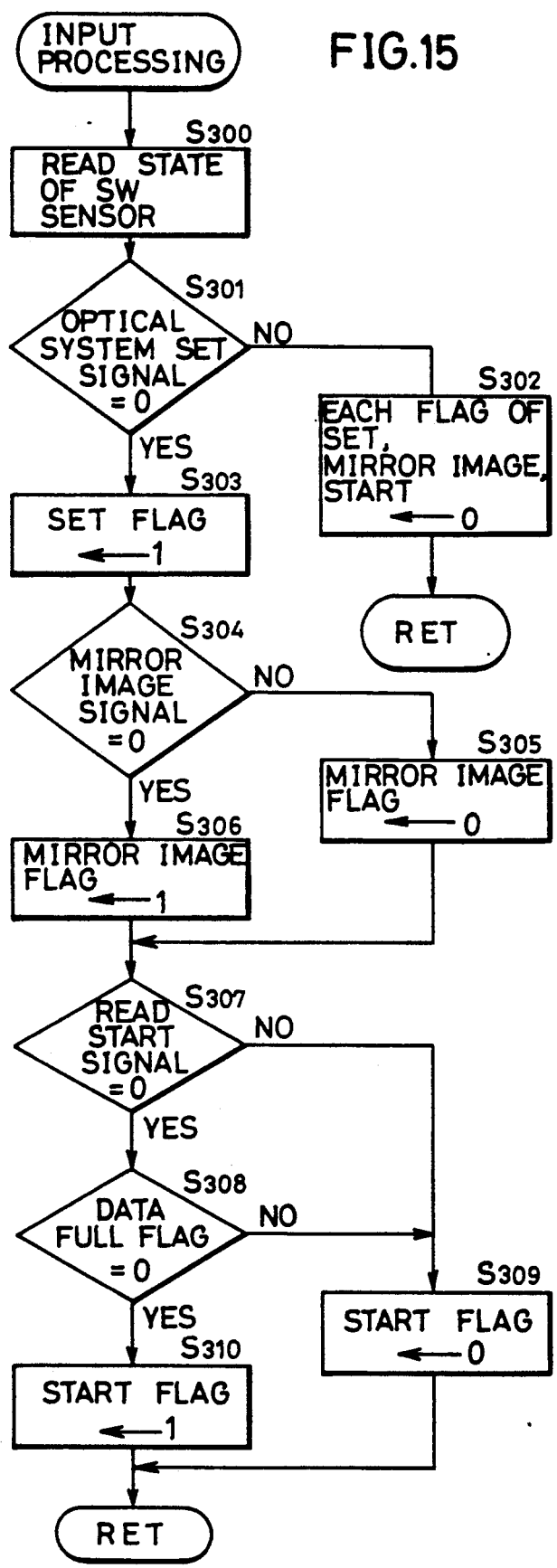
FIG. 15 is a flow chart diagram showing specific contents of the subroutine of input/output shown in FIG. 13.

FIG. 15 is a flow chart diagram showing specific contents of the subroutine of input processing shown in FIG. 13.

First, at step S300, setting states of switch, sensor and the like are read out and then at step S301, determination is made as to whether or not the optical system set signal has been output. When the set signal has not yet been output, then the respective flags of set, mirror image and start are made to represent 0, thereby indicating that the optical system unit has not yet been mounted on the apparatus. Then, the operation returns to the main routine.

When the set signal has been output (YES at S301), the set flag is made to represent 1 at step S303 and then at step S304, determination is made as to whether or not the mirror image signal has been output, or whether or not the mirror image switch has been turned on. When the mirror image signal has not been yet output, the mirror image flag is made to represent 0 at step S305 and the operation proceeds to step S307. When the mirror image signal has been output (YES at S304), then at step 306, the mirror image flag is made to represent 1, thereby indicating that the image data are to be processed to form a mirror image. Then, the operation proceeds to step S307.

Meanwhile, relation between ON/OFF of the above-described mirror image signal and the mirror image flag is based on use of the standard scanner shown in FIG. 1. On the other hand, when the scale-down scanner is used, the image data are inverted by the optical system itself. In that case, the logic of ON/OFF of the mirror image switch needs only to be reversed with respect to that of the standard scanner case. That is, when the mirror image switch is turned off, the mirror image signal is output and the image once inverted by the optical system is inverted again through the mirror image processing. Therefore, when the mirror image switch is turned off, the mirror image flag may be made to represent 1.

At step S307, determination is made as to whether or not the read start signal has been output, or whether or not the start switch has been pressed. When the read start signal has not been yet output, the start flag is made to represent 0 at step S309 to demand stop of reading operation. Then, the operation returns to the main routine. When the start signal has been output (YES at S307), determination is made at step S308 as to whether or not the data full flag is representing 0, or whether or not there is an empty area for data. When the flag is not representing 0, there is no margin of memory area. Then, at step S309, the start flag is made to represent 0 so as to stop reading. Thereafter, the operation returns to the main routine. When the data full flag is representing 0 (YES at S308), there is margin of memory area. Then, the start flag is made to represent 1 at step S310, thereby indicating that reading is to be started. Then the operation returns to the main routine.

Figure 16:
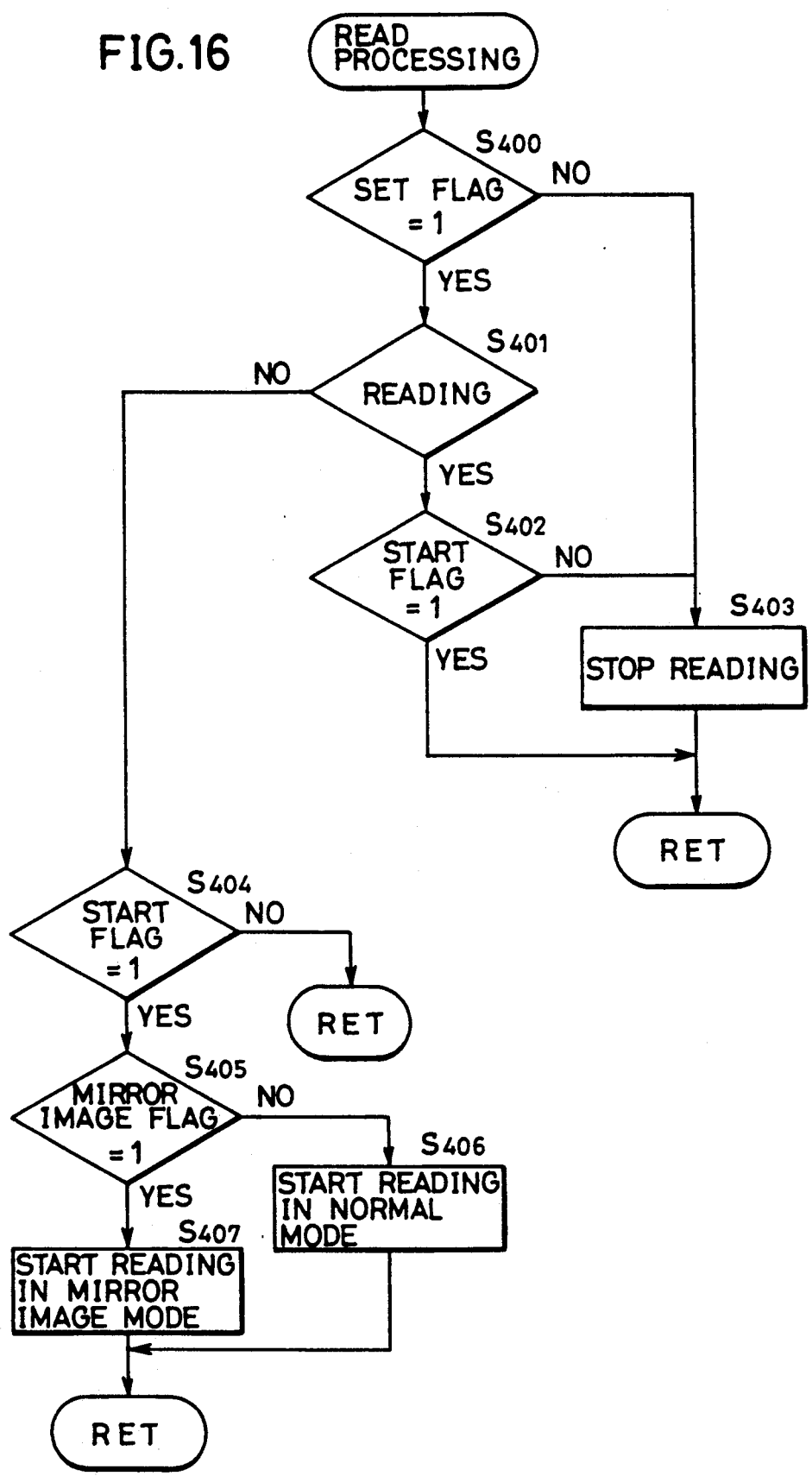
FIG. 16 is a flow chart diagram showing specific contents of the subroutine of read processing shown in FIG. 13.

FIG. 16 is a flow chart diagram showing specific contents of the subroutine of reading operation shown in FIG. 13.

First, at step S400, determination is made as to whether the set flag indicating setting state of the optical system is representing 1 or not. When the set flag is not representing 1, the optical system has not been yet set. Then, reading operation is stopped at step S403 and the operation returns to the main routine. When the set flag is representing 1 (YES at S400), determination is made at step S401 as to whether a reading operation has been already started or not. When a reading has been already started, determination is made at step S402 as to whether the start flag is representing 1 or not. When the start flag is representing 1, the operation returns to the main routine to continue the reading operation. However, when the start flag is not representing 1, the reading is stopped at step S403 and then the operation returns to the main routine. When reading has not been started at step S401, determination is made at step S404 as to whether the start flag is representing 1 or not. When the start flag is not representing 1, reading operation can not be started. Therefore, the operation immediately returns to the main routine. When the start flag is representing 1, or when the start switch has been pressed, determination is made at step S405 as to whether the mirror image flag is representing 1 or not. When the mirror image flag is not representing 1, reading operation in the normal mode is started at step S406 and then the operation returns to the main routine. When the mirror image flag is representing 1, reading operation in the mirror image mode is started at step S407 and then the operation returns to the main routine.

Figure 17:
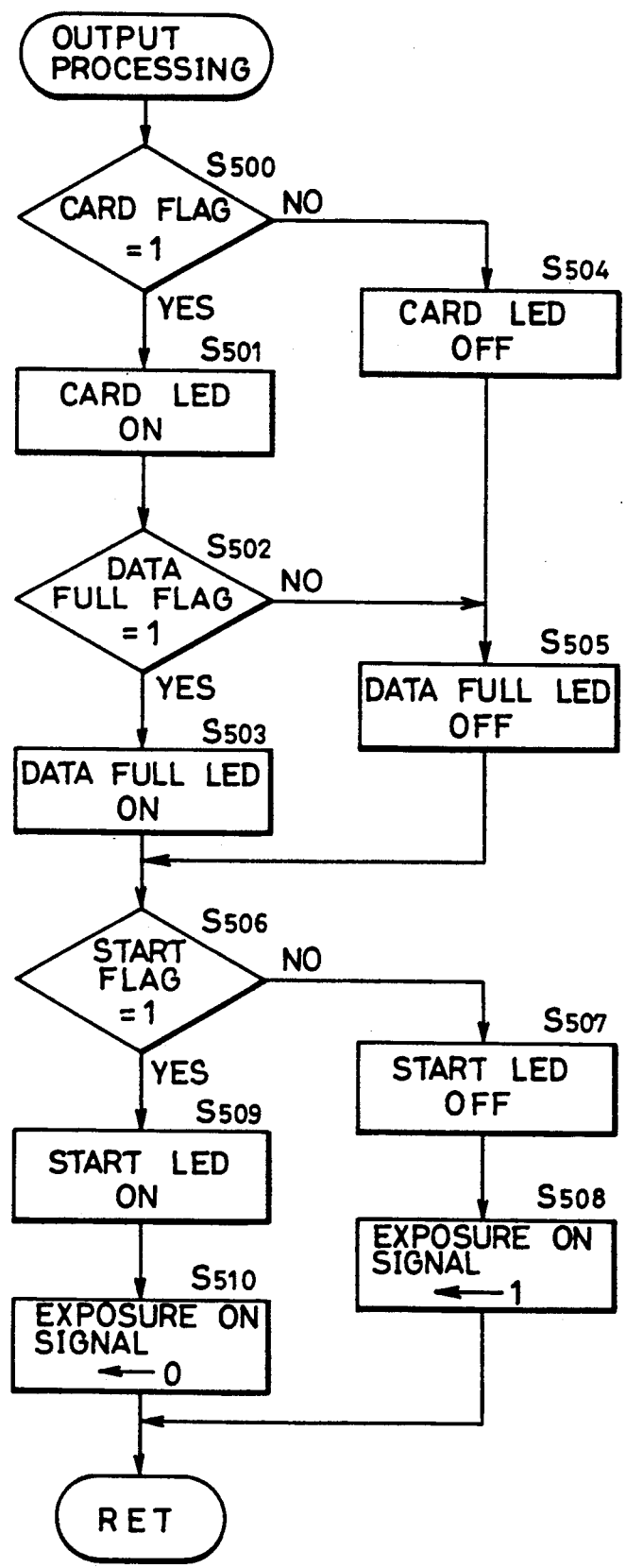
FIG. 17 is a flow chart diagram showing specific contents of the subroutine of output processing shown in FIG. 13.

FIG. 17 is a flow chart diagram showing specific contents of the subroutine of output processing shown in FIG. 13.

First, at step S500, determination is made as to whether the card flag indicating presence or absence of an inserted memory card is representing 1 or not. When the card flag is not representing 1, or when no memory card has been inserted in the read portion, the card LED at the display portion 4 is turned off at step S504 to indicate absence of memory card. Thereafter, when the data full LED has been lighted, it is turned off at step S505 and then the operation proceeds to step S506. When the card flag is representing 1 (YES at S500), a memory card has been inserted in the read portion. Then, the card LED at the display portion is turned on at step S501 and then determination is made at step S502 as to whether the data full flag is representing 1 or not. When the data full flag is not representing 1, there remains margin of memory area in the card. Then, the data full LED is turned off at step S505 and the operation proceeds to step S506. When the data full flag is representing 1 (YES at S502), there is no margin of memory area. Then, the data full LED is turned on at step S503 and determination is made at step S506 as to whether the start flag is representing 1 or not. When the start flag is not representing 1, reading operation has not been yet started. Then, the start LED at the display portion is turned off at step S507 and the exposure ON signal is made to represent 1 at step S508 so as to stop exposure of the original. Then, the operation returns to the main routine. When the start flag is representing 1 (YES at S506), the start LED is turned on at step S509 so as to indicate start of a reading operation, and the exposure ON signal is made to represent 0 at step S510 so as to turn on the LED array, starting exposure of the original. Then, the operation returns to the main routine.

As has been described above, according to the present invention, the optical system and the processing portion are detachable from each other. Therefore, by employing an optical system suitable to purposes of reading, the read width and the like can be changed without causing any change of the processing portion.

Further, according to the present invention, the optical system and the processing portion are detachable from each other and a clock signal for controlling reading is generated in the optical system. Therefore, appropriate image processings are possible even when the optical system is replaced by another one.

Furthermore, according to the present invention, instructions as to image processing manner are given by the optical system detachably attached to the processing portion. Therefore, image processings can be performed as desired.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A detachable two-part component image recording apparatus comprising:

a first image processing unit consisting of a first housing member, a light source, a rod lens, a first electrical connector, and means for synchronizing the reading of image data, the first housing member operatively supporting the light source to illuminate a document and the rod lens to transmit any image, the means for synchronization including a synchronizing clock generator for providing clock signals being supported within the first housing; and a second image processing unit having a second housing member detachably mounted to the first housing member, the second housing member integrally supporting an image sensor for alignment with the rod lens, a second electrical connector for attachment to the first electrical connector, a signal processor for processing an output of the image sensor in response to the clock signals from the synchronizing clock generator and a detachable memory for storing the processed output.

2. The invention of claim 1 wherein the detachable memory is a replaceable memory card.

* * * * *